(12) United States Patent
Fuller et al.

(10) Patent No.: US 9,263,804 B2
(45) Date of Patent: Feb. 16, 2016

(54) COMPOSITES FOR ANTENNAS AND OTHER APPLICATIONS

(71) Applicant: Orbital ATK, Inc., Dulles, VA (US)

(72) Inventors: Christopher C. Fuller, Bloomington, MN (US); John R. Lamberg, Minnetonka, MN (US); Michael J. Gawronski, Minneapolis, MN (US)

(73) Assignee: Orbital ATK, Inc., Plymouth, MN (US)

( * ) Notice: Subject to any disclaimer, the term of this patent is extended or adjusted under 35 U.S.C. 154(b) by 0 days.

(21) Appl. No.: 14/228,627

(22) Filed: Mar. 28, 2014

(65) Prior Publication Data
US 2014/0253409 A1    Sep. 11, 2014

Related U.S. Application Data

(63) Continuation of application No. 12/548,937, filed on Aug. 27, 2009, now Pat. No. 8,723,722.

(60) Provisional application No. 61/092,577, filed on Aug. 28, 2008.

(51) Int. Cl.
*H01Q 21/00* (2006.01)
*F41H 13/00* (2006.01)
(Continued)

(52) U.S. Cl.
CPC ........... *H01Q 21/00* (2013.01); *F41H 13/0043* (2013.01); *F42C 13/00* (2013.01);
(Continued)

(58) Field of Classification Search
CPC ............. H01Q 1/27; H01Q 1/28; H01Q 1/36; H01Q 1/364; H01Q 21/00; H01Q 21/06; H01Q 21/61; H01Q 21/065; G01S 7/02; G01S 7/41; G01S 7/414; G01S 13/88; G01S 13/885; F41H 13/0043; F42C 13/00; G02B 1/002; G02B 1/007; G02B 5/20; G02B 5/204; Y10T 428/31504

USPC .......... 342/21, 22, 175; 343/700 R, 893, 907, 343/700 MS, 709; 333/236, 239; 428/411.1
See application file for complete search history.

(56) References Cited

U.S. PATENT DOCUMENTS 3,611,390 A    10/1971    Chiron et al.
3,798,578 A    3/1974    Konishi et al.
(Continued)

FOREIGN PATENT DOCUMENTS

GB            738877 A    *  10/1955

OTHER PUBLICATIONS

Andrews, Anne et al., "Research of Ground-Penetrating Radar for Detection of Mines and Unexploded Ordnance: Current Status and Research Strategy", Institute for Defense Analysis. Dec. 1999, IDA Document No. D-2416, Log: H 99-002922.
(Continued)

*Primary Examiner* — Bernarr Gregory
(74) *Attorney, Agent, or Firm* — TraskBritt

(57) ABSTRACT

Composite material, devices incorporating the composite material and methods of forming the composite material are provided. The composite material includes interstitial material that has at least one of a select relative permittivity property value and a select relative permeability property value. The composite material further includes inclusion material within the interstitial material. The inclusion material has at least one of a select relative permeability property value and a select relative permittivity property value. The select relative permeability and permittivity property values of the interstitial and the inclusion materials are selected so that the effective intrinsic impedance of the interstitial material and the inclusion material match the intrinsic impedance of air. Devices made from the composite include metamaterial and/or metamaterial-inspired (e.g., near-field LC-type parasitic) substrates and/or lenses, front-end protection, stealth absorbers, filters and mixers. Beyond the intrinsic, applications include miniature antennas and antenna arrays, directed energy weapons, EMI filters, RF and optical circuit components, among others.

21 Claims, 16 Drawing Sheets

(51) Int. Cl.
*F42C 13/00* (2006.01)
*G01S 7/41* (2006.01)
*G01S 13/88* (2006.01)
*H01Q 1/28* (2006.01)
*H01Q 1/36* (2006.01)
*H01Q 21/06* (2006.01)
*G02B 1/00* (2006.01)
*G02B 5/20* (2006.01)
*G01S 7/02* (2006.01)

(52) U.S. Cl.
CPC .............. *G01S 7/414* (2013.01); *G01S 13/885* (2013.01); *G02B 1/007* (2013.01); *G02B 5/204* (2013.01); *H01Q 1/28* (2013.01); *H01Q 1/364* (2013.01); *H01Q 21/065* (2013.01); *Y10T 428/31504* (2015.04)

(56) References Cited

U.S. PATENT DOCUMENTS

| | | | |
|---|---|---|---|
| 3,919,672 A | 11/1975 | Plourde | |
| 3,924,208 A | 12/1975 | Plourde | |
| 3,943,520 A | 3/1976 | Apstein et al. | |
| 4,087,822 A | 5/1978 | Maybell et al. | |
| 4,122,418 A | 10/1978 | Nagao | |
| 4,217,827 A | 8/1980 | Dent | |
| 4,623,857 A | 11/1986 | Nishikawa et al. | |
| 4,755,820 A | 7/1988 | Backhouse et al. | |
| 4,809,011 A | 2/1989 | Kunz | |
| 5,258,596 A | 11/1993 | Fabish et al. | |
| 5,563,616 A | 10/1996 | Dempsey et al. | |
| 5,633,972 A | 5/1997 | Walt et al. | |
| 5,783,979 A | 7/1998 | Andoh et al. | |
| 5,880,650 A | 3/1999 | Latouche et al. | |
| RE36,506 E | 1/2000 | Dempsey et al. | |
| 6,063,719 A | 5/2000 | Sengupta et al. | |
| 6,169,467 B1 | 1/2001 | El-Sharawy | |
| 6,414,571 B1 | 7/2002 | Hunter et al. | |
| 6,421,023 B1 | 7/2002 | Phelan | |
| 6,496,087 B1 | 12/2002 | Hattori et al. | |
| 6,507,254 B1 | 1/2003 | Hattori et al. | |
| 6,529,094 B1 | 3/2003 | Kubo et al. | |
| 6,549,092 B1 | 4/2003 | Hattori et al. | |
| 6,552,627 B1 | 4/2003 | Andoh et al. | |
| 6,661,392 B2 | 12/2003 | Isaacs et al. | |
| 6,689,287 B2 | 2/2004 | Schubring et al. | |
| 6,731,248 B2 | 5/2004 | Killen et al. | |
| 6,734,827 B2 | 5/2004 | Killen et al. | |
| 6,753,814 B2 | 6/2004 | Killen et al. | |
| 6,781,487 B2 | 8/2004 | Hattori et al. | |
| 6,788,273 B1 | 9/2004 | Schultz et al. | |
| 6,791,432 B2 | 9/2004 | Smith et al. | |
| 6,842,140 B2 | 1/2005 | Killen et al. | |
| 6,888,425 B2 | 5/2005 | Matsui et al. | |
| 6,908,960 B2 | 6/2005 | Takaya et al. | |
| 6,938,325 B2 | 9/2005 | Tanielian | |
| 6,943,731 B2 | 9/2005 | Killen et al. | |
| 6,958,729 B1 | 10/2005 | Metz | |
| 7,138,891 B2 | 11/2006 | Andoh et al. | |
| 7,218,190 B2 * | 5/2007 | Engheta et al. | 333/239 |
| 7,218,285 B2 | 5/2007 | Davis et al. | |
| 7,256,753 B2 | 8/2007 | Werner et al. | |
| 7,301,493 B1 | 11/2007 | Canales et al. | |
| 7,332,987 B2 | 2/2008 | Wada et al. | |
| 7,349,196 B2 | 3/2008 | Chang et al. | |
| 7,391,288 B1 | 6/2008 | Itoh et al. | |
| 7,405,698 B2 | 7/2008 | de Rochemont | |
| 7,429,957 B1 * | 9/2008 | Tonn | 343/709 |
| 7,525,711 B1 | 4/2009 | Rule et al. | |
| 7,592,957 B2 | 9/2009 | Achour et al. | |
| 7,629,937 B2 | 12/2009 | Lier et al. | |
| 7,688,278 B2 | 3/2010 | Frenkel | |
| 7,710,336 B2 | 5/2010 | Schweizer et al. | |
| 7,750,869 B2 | 7/2010 | Mosallaei | |
| 7,764,232 B2 | 7/2010 | Achour et al. | |
| 7,777,690 B2 | 8/2010 | Winsor | |
| 7,777,962 B2 | 8/2010 | Bowers et al. | |
| 7,830,618 B1 | 11/2010 | Bowers et al. | |
| 7,855,696 B2 | 12/2010 | Gummalla et al. | |
| 7,864,114 B2 | 1/2011 | Sanada | |
| 7,880,614 B2 | 2/2011 | Forster et al. | |
| 7,911,386 B1 * | 3/2011 | Itoh et al. | 343/700 MS |
| 7,911,407 B1 | 3/2011 | Fong et al. | |
| 7,928,900 B2 | 4/2011 | Fuller et al. | |
| 7,952,526 B2 | 5/2011 | Lee et al. | |
| 8,207,907 B2 | 6/2012 | Hyde et al. | |
| 8,271,241 B2 | 9/2012 | Akyurtlu et al. | |
| 2001/0026243 A1 | 10/2001 | Koitsalu et al. | |
| 2002/0070900 A1 | 6/2002 | Phelan | |
| 2004/0104847 A1 | 6/2004 | Killen et al. | |
| 2005/0225492 A1 | 10/2005 | Metz | |
| 2006/0028385 A1 | 2/2006 | Davis et al. | |
| 2006/0229187 A1 | 10/2006 | Liufu | |
| 2007/0138402 A1 | 6/2007 | Hyde et al. | |
| 2009/0135086 A1 | 5/2009 | Fuller et al. | |

OTHER PUBLICATIONS

Balanis, C., "Antenna Theory Analysis and Design", (John Wiley and Sons, 1982), pp. 104-111.

Barbagallo, Sebastiana et al., "Compact Mu-Negative (MNG) and Double-Negative (DNG) Media Using Bilayered Frequency Selective Surfaces Connected by Vias", IEEE Antennas and Propagation Symposium Digest. Jul. 2006, p. 155.

Bonache, F. Martin et al., "Super Compact Split Ring resonators CPW Band Pass Filters", IEEE Microwave Symposium Digest, 2004 IEEE MTT-S Digest. Jun. 2004, pp. 1483-1486.

Buell, K. et al., "Embedded-Circuit Magnetic Metamaterial Substrate Performance for Patch Antennas", IEEE Antennas and Propagation Symposium Digest. Jun. 2004, vol. 2, pp. 1415-1418.

Buell, Kevin, Development of Engineered Magnetic Materials for Antenna Applications. PhD Dissertation, University of Michigan, 2005, Chapter 4 (Material Characterization).

Chew, Herman et al., "Elasticscattering of evanescent electromagnetic waves". Applied Optics. Aug. 1979, vol. 18, No. 15, pp. 2679-2687.

Ebbesen, T. W. et al., "Extraordinary Optical Transmission through Sub-Wavelength Hole Arrays". Nature. Feb. 12, 1998, vol. 391, pp. 667-669.

Fang, Nicholas et al., "Imaging Properties of a Metamaterial Superlens". Applied Physics Letters. Jan. 13, 2003, vol. 82, No. 2, pp. 161-163.

Fang, Nicholas et al., "Ultrasonic Metamaterials with Negative Modulus", Nature Materials. Jun. 2006, vol. 5. pp. 452-456. [Online] www.nature.com/naturematerials.

Gingrich, M.A. et al., Synthesis of Zero Index of Refraction Metamaterials via Frequency-Selective Surfaces Using Genetic Algorithms, IEEE Antennas and Propagation Society International Symposium. Dec. 12, 2005. vol. 1A, pp. 713-716.

Goldhirsh, J., "Class Notes for Propagation of Radio Waves in the Atmosphere", Johns Hopkins University, Fall 1994, Chapter 5, Section 5.1., 2 pages.

Holden, Anthony, "Inside the Wavelength: Electromagnetics in the Near Field". Foresight Directorate, [Online], Date unknown, <http://www.foresight.gov.uk>, Feb. 2004, 57 pages. #.

Holloway, C. L., "A Double Negative (DNG) Composite Medium Composed of Magnetodielectric Spherical Particles Embedded in a Matrix". IEEE Transactions on Antennas and Propagation. Oct. 2003, vol. 51, Issue 10, pp. 2596-2603.

Ikonen et al. "Magneto-Dielectric Substrates in Antenna Miniaturization: Potential and Limitations" Radio Laboratory/SMARAD, Helsinki University of Technology. arXiv:physics/0603116v1 [physics.class-ph]. (Mar. 15, 2006), 19 pages.

Jylha, Liisi et al. "Numerical Modeling of Disordered Mixture Using Pseudorandom Simulations" IEEE Transactions on Geoscience and Remote Sensing, vol. 43, No. 1, (Jan. 2005), pp. 59-64.

Katehi, Linda et al., "A New Generation of Antenna Structures Based On Novel Composite Materials", ARO Final Report, Aug. 1, 1998-

(56) References Cited

OTHER PUBLICATIONS

Jan. 1, 1999, 37348-1-T=RL-2514. <http://deepblue.lib.umich.edu/bitstream/2027.42/21535/1/r12514.0001.001.txt>.
Kim, Jaewon et al., "Application of Cubic High Dielectric Resonator Metamaterial to Antennas". IEEE Antennas and Propagation International Symposium, Jun. 2007, pp. 2349-2352.
Kistenmacher, T. J. et al., "An Innovative Unit Cell Guide to Multimodal Frequency-Selective Surfaces", IEEE Antennas and Propagation Symposium Digest. Jul. 2006, pp. 4175-4178.
Koledintseva, Marina et al., "Engineering of Composite Media for Shields at Microwave Frequencies". IEEE International Symposium on Electromagnetic Compatibility, Aug. 2005, vol. 1, pp. 169-174.
Koledintseva, Marina et al., "Engineering of Ferrite-Graphite Composite Media for Microwave Shields". IEEE International Symposium on Electromagnetic Compatibility, Aug. 14-18, 2006, vol. 3, pp. 598-602.
Levy, Uriel, et al., "Design, Fabrication, and Characterization of Subwavelength Computer-Generated Holograms for Spot Array Generation", Optics Express. Nov. 1, 2004, vol. 12, No. 22, pp. 5345-5355.
Lewis, Aaron, et al., "Near-Field Optics: From Subwavelength Illumination to Nanometric Shadowing", Nature Biotechnology. Nov. 2003, vol. 21, No. 11, pp. 1378-1386.
Lim, Sungjoon et al., "Electronically-Controlled Metamaterial-Based Transmission Line as a Continuous-Scanning Leaky-Wave Antenna", IEEE Microwave Symposium Digest, 2004 IEEE MTT-S Digest. Jun. 2004, pp. 313-316.
Liu, Hsing-Nuan, et al., "Design of Antenna Radome Composed of Metamaterials for High Gain", IEEE Antennas and Propagation Symposium Digest. Jul. 2006, pp. 19-22.
Liu, Ce et al., "Dispersion characteristics of two-component two-dimensional mixtures". [Modelling] and Simulation in Materials Science and Engineer, 1993, vol. 1, pp. 723-730.
Luo, Xiangang et al., "Subwavelength Photolithography Based on Surface-Plasmon Polariton Resonance", Optics Express. Jul. 12, 2004, vol. 12, No. 14, pp. 3055-3065.
MacDonald, J. et al., "Alternatives for Landmine Detection", Rand Science and Technology Policy Institute. 2003. p. 138, ISBN 0-8330-3301-8.
Markley, Loic et al., "A Polarization Independent Negative-Refractive-Index Metamaterial for Incident Plane Waves", IEEE Antennas and Propagation Symposium Digest. Jul. 2006, pp. 1923-1926.
Marshall, Todd S. et al., "A Calibrated Microwave Directional Bridge for Remote Network Analysis Through Optical Fiber", IEEE International Microwave Symposium Digest IEEE MIT-S. Jun. 2006, pp. 1967-1970.
Massey, G. A., "Microscopy and pattern generation with scanned evanescent waves". Applied Optics. Mar. 1, 1984. vol. 23, No. 5, pp. 658-660.
Nassenstein, Win Weg Sur Uberschreitiung der Klassischen Auflosungsgrenze Bei Abbildungsvorgangen, H. Physics Letters. May 5, 2969, vol. 29a, No. 4 pp. 175-176.
Patton C. et al., "New Materials and Configurations for 10-100 GHz Microwave Devices", MTT Workshop New Technologies for Frequency and Phase Agile Microwave circuits and Systems. Jun. 7, 2004.
Pendry, J. B. et al., "Magnetism from Conductors and Enhanced Nonlinear Phenomena". IEEE Transactions Microwave Theory Technologies, Nov. 1999, vol. 47, No. 11, pp. 2075-2084.
Quiant, Romain et al., "Sub-wavelength patterning of the optical near-field", Optics Express. Jan. 26, 2004. vol. 12, No. 2, pp. 282-287.
Quidant, R. et al., "Generation of Subwavelength Traps in the Optical Near-Field", Proceedings of SPIE. 2004, vol. 5514, pp. 578-585.
Ramakrishna, S. A. et al., "The Assymetric Lossy Near-Perfect Lens". Journal of Modern Optics. 2002, vol. 49, No. 10, pp. 1747-1762.
Rennings, A. et al., "A Novel Clustered Dielectric Cubes Metamaterial (CDC- MTM)", IEEE Antennas and Propagation Symposium Digest. Jul. 2006, pp. 483-486.
Ricci, Michael et al., "Superconducting Metamaterials", Applied Physics Letters. 2005. vol. 87, pp. 034102-1-034102-3.
Satimo Measurement Systems Website—FAQ3—Near Field and Far Field. [online], [retrieved on Mar. 29, 2010], <http://www.satimo.fr/engbndex.ghg?categoryid=29>, 2 pages.
Shore, Robert A. et al., "Traveling Waves on 1D, 2D, and 3D Periodic Arrays of Nanospheres", IEEE Antennas and Propagation Symposium Digest. Jul. 2006, p. 760.
Sihvola, Ari H. et al. "Effective Permittivity of Dielectric Mixtures" IEEE Transactions on Geoscience and Remote Sensing, vol. 26, No. 4, (Jul. 1988), pp. 420-429.
Smith, D. R. et al., "Limitations on Sub-Diffraction Imaging with a Negative Refractive Index Slab", Applied Physics Letters. Mar. 10, 2003. vol. 82, No. 10, pp. 1506-1508.
Smith, D. R. et al., (Department of Physics, University of California, San Diego) "Limitations on Sub-Diffraction Imaging with a Negative Refractive Index Slab", Submitted Aug. 23, 2001. pp. 1-18.
Smith, David, "Superlens Breaks Optical Barrier", PhysicsWeb, Aug. 2005, [retrieved Jun. 9, 2006] [Online] http://www.physicsweb.org/articles/world/18/8/4.
Vendik, I. et al. "Modeling of isotropic double negative media for microwave applications" OPTO-Electronics Review, vol. 14, No. 3 (2006), pp. 179-186.
Vigoureux, J. et al., "General principles of scanning tunneling optical microscopy", Optics Letters. Oct. 1, 1989, vol. 14, No. 19, pp. 1039-1041.
Wolf, Emil, et al. "Analyticity of the angular spectrum amplitude of scattered fields and some of its consequences", Journal Optical Society of America. Jun. 1985, vol. 2, No. 6 pp. 886-890.
Wu et al. "Evaluation of Effective Electrical Properties for Lossy Periodic Composite Structures using a Finite Difference Method" Department of Electrical and Computer Engineering, University of Houston, Houston, Texas, [online], Aug. 13, 2008, URSI General Assembly, Chicago, IL. [retrieved on Feb. 19, 2014]. Retrieved from the Internet at <<http://www.ursi.org/proceedings/procGA08/papers/A06p4.pdf> ,4 pages.
Wu, Dagang et al. "Numerical evaluation of effective dielectric properties of three-dimensional composite materials with arbitrary inclusions using a finite-difference time-domain method" Journal of Applied Physics, vol. 102, 024107 (2007) [online] [retrieved on Jun. 14, 2013] American Institute of Physics. Retrieved from: <http:/ldx.doi.org/10.1063/1.2756089>, 9 pages.
Wu, Dagang et al. "Numerical Modeling of Periodic Composite Media for Electromagnetic Shielding Application" Department of Electrical and Computer Engineering, University of Houston, Houston, Texas. IEEE 1-4244-1350- 8/07/$25.00 (2007), 5 pages.
Wu, Hsu-Hsiang et al. "Evaluation of Effective Electrical Properties for Lossy Periodic Composite Structures using a Finite Difference Method" Department of Electrical and Computer Engineering, University of Houston, Houston, Texas (Date Unknown), 4 pages.
Xiong Jie et al., "Is Periodicity Required for Negative Index Materials?", IEEE Antennas and Propagation Symposium Digest. Jun. 2004, vol. 3, pp. 3143-3146.
Xu, Wei et al., "Design of Left-Handed Materials with Broad Bandwidth and Low Loss Using Double Resonant Frequency Structure", IEEE Antennas and Propagation Symposium Digest. Jun. 2004, vol. 4, pp. 3792-3795.
Zhuromskyy 0. et al., "2D Metamaterials with Hexagonal Structure: Spatial Resonances and Near Field Imaging", Optics Express. Nov. 14, 2005, vol. 13, No. 23, pp. 9299-9309.

* cited by examiner

COMPOSITES FOR ANTENNAS AND OTHER APPLICATIONS

CROSS-REFERENCE TO RELATED APPLICATIONS

This application is a continuation of U.S. patent application Ser. No. 12/548,937, filed Aug. 27, 2009, now U.S. Pat. No. 8,723,722, issued May 13, 2014, which claims priority to U.S. Provisional Patent Application No. 61/092,577, filed Aug. 28, 2008 and both having the same title herewith, each of which is hereby incorporated herein in its entirety.

BACKGROUND

Electromagnetic waves, such as radio waves, incident on a boundary between two materials reflect or pass into each material based on the difference in intrinsic impedance between the materials. For boundaries between air and high permittivity materials, a mismatch occurs that results in a loss of efficiency. This mismatch results in a reflection of some of the incident energy. One application that implements high permittivity materials is an antenna system. The use of high permittivity materials in antenna systems provides benefits. In particular, with the use of high permittivity antenna systems, the size of the antenna can be reduced compared to typical antenna systems which leads to greater applications and reduced overall sizes.

For the reasons stated above and for other reasons stated below, which will become apparent to those skilled in the art upon reading and understanding the present specification, there is a need in the art for materials and devices containing materials that provide relatively high efficiency for electromagnetic waves at material boundaries.

SUMMARY

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, an antenna system is provided. The antenna system includes at least one antenna. The at least one antenna includes interstitial material and inclusion material. The interstitial material has at least one of a select relative permittivity property value and a select relative permeability property value. The inclusion material is received within the interstitial material. The inclusion material has at least one of a select relative permeability property value and a select relative permittivity property value. The select relative permeability and permittivity property values of the interstitial material and the inclusion material provides an effective intrinsic impedance of the composite material that closely matches the intrinsic impedance of air.

In another embodiment, another antenna system is provided. The antenna system includes at least one receive antenna and at least one transmit antenna. The at least one receive antenna includes interstitial material that has at least one of a select relative permittivity property value and a select relative permeability property value. The inclusion material is received within the interstitial material. The inclusion material has at least one of a select relative permeability property value and a select relative permittivity property value. The select relative permeability and permittivity property values of the interstitial material and the inclusion material provide an effective intrinsic impedance of the composite material that closely matches the intrinsic impedance of air. The at least one transmit antenna includes interstitial material that has at least one of a select relative permittivity property value and a select relative permeability property value. The inclusion material is received within the interstitial material. The inclusion material has at least one of a select relative permeability property value and a select relative permittivity property value. The select relative permeability and permittivity property values of the interstitial material and the inclusion material provide an effective intrinsic impedance of the composite material that closely matches the intrinsic impedance of air.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout the figures and the specification.

DETAILED DESCRIPTION

Figure 2:
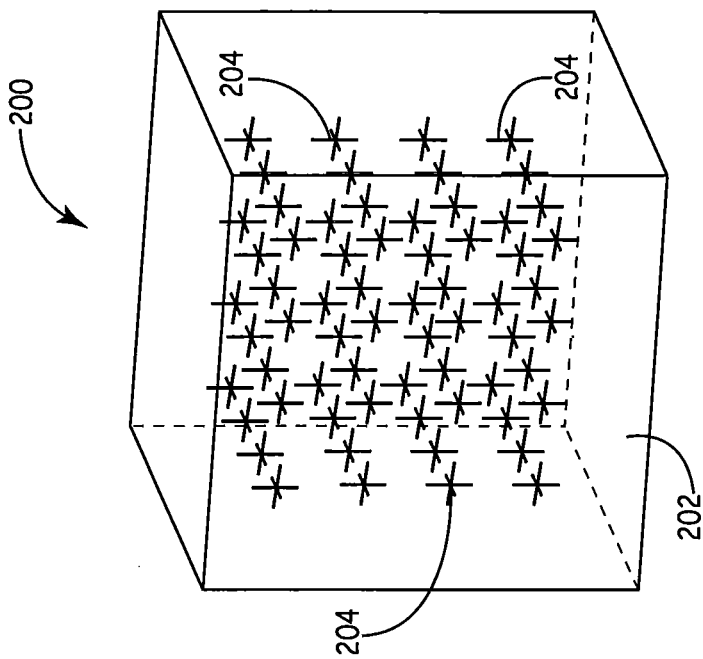
FIG. 2 is a three-dimensional illustration of composite material of another embodiment of the present invention.

In the following detailed description, reference is made to the accompanying drawings, which form a part hereof and in which is shown by way of illustration, specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention use metamaterials or metamaterial-inspired elements at material boundaries. The metamaterials and metamaterial-inspired elements are generally referred to as composite materials. Metamaterials are artificial materials that, in embodiments include interstitial material having inclusions. The interstitial material and the inclusions in embodiments each have at least one of select relative permittivity property values and select relative permeability property values. Metamaterials have a three-dimensional periodic cellular architecture designed to produce a response to a specific excitation that would not be available in naturally occurring elements. In particular, metamaterials have unusual electromagnetic properties that result in negative permittivity, negative permeability and/or negative index of refraction that are controlled by the design of the material. For example, standard media with a permeability of ($\mu$)>0 and permittivity ($\in$)>0, refracts light onto the opposite side of a surface normal at the boundary between the surfaces in the customary manner. However, metamaterial with a permeability of ($\mu$)<0 and permittivity ($\in$)<0, refracts light onto the same side of normal at the boundary between the surfaces. By refracting an electromagnetic wave onto the same side of the surface normal, a much stronger refraction event occurs than can be achieved by refractions in other natural materials.

Traditional metamaterial techniques generally refer to using sub-wavelength sized resonators to achieve effective relative permittivity ($\in_r$)=effective relative permeability ($\mu_r$)=−1. Metamaterial-inspired techniques refer to the use of sub-wavelength sized resonators to achieve relative permittivity ($\in_r$) other than −1 and effective relative permeability ($\mu_r$) other than −1. For metamaterial inspired techniques, if one parameter is negative then the other is sometimes negative in order to prevent excessive losses. Metamaterial and metamaterial-inspired techniques both differ from using the natural permittivity and permeability of materials because both techniques utilize sub-wavelength sized resonators instead of the inherent material properties to achieve the effective material properties. In some embodiments of near-field lens applications a portion of the lens may be metamaterial, another portion may be metamaterial-inspired and other portions may be natural materials, depending upon the characteristics of the source and the system requirements.

Some embodiments of composite material are made to have high permittivity. Moreover, some embodiments provide composite materials with effective intrinsic impedance that closely matches that of air. The effective intrinsic impedance that closely matches air is achieved in embodiments by making the relative permeability and permittivity properties of the material relatively close in value (i.e., high-index). By matching the material to the intrinsic impedance of air, no wave reflection occurs at the material boundary with the air, which allows more energy to enter the material than would otherwise. Benefits of composite material will be seen in embodiments as described below. Such embodiments include antennas such as antennas having applications for, but not limited to, miniature phased and retrodirective arrays for fuzing applications, smaller antennas for medical implants, ground/building/car radars, magnetic resonance imaging (MRI) antennas, cell phones, two-way radios, trunked radio systems, undersea radar and communications, two-way trunking, commercial broadcast, radio frequency identification (RFID) systems, microscopy, smaller broadband printed circuit boards (PCBs), cables, more effective anechoic chambers, missile defense systems, etc. Other example embodiments include stealth coatings to prevent detection by radar, spatial filters (e.g., EMI filters and front-end protection) and mixers as discussed below. The composite also enables miniature near-field lenses and non-metamaterial (metamaterial-inspired) lenses, such as lenses described in the commonly assigned U.S. patent application Ser. No. 11/955,795 filed Dec. 13, 2007, now U.S. Pat. No. 7,928,900, which claims priority to U.S. Provisional Application No. 60/875,323 filed Dec. 15, 2006, titled "Improved Resolution Radar Using Metamaterials," which are both herein incorporated in their entirety.

Figure 1:
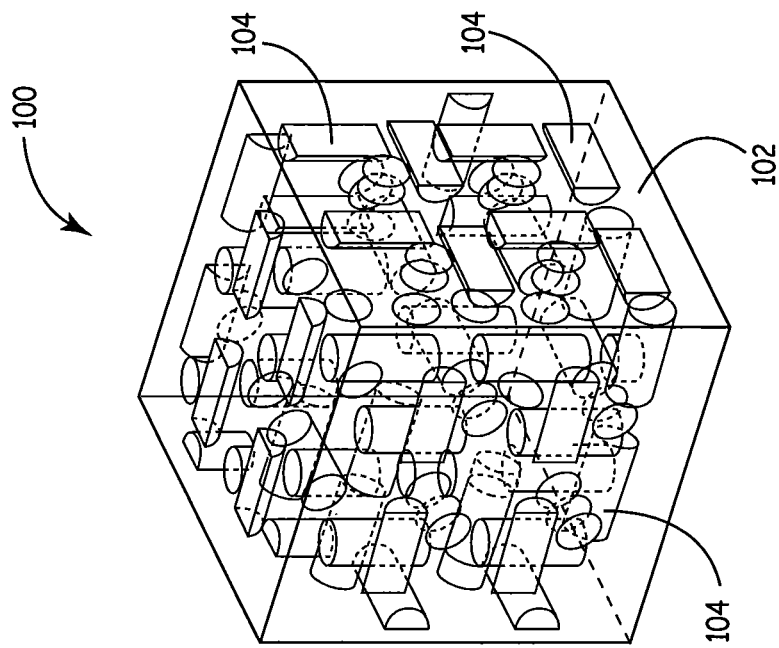
FIG. 1 is a three-dimensional illustration of composite material of one embodiment of the present invention.

Examples of composite materials 100, 200, 300 and 400 are illustrated in FIGS. 1, 2, 3 and 4, respectively. Referring to FIG. 1, composite material 100 of one embodiment is illustrated. The composite material 100 includes interstitial material 102 that has a select relative permittivity property value and inclusions 104 that have a select relative permeability property value. Examples of high permittivity material used for the interstitial material include, but are not limited to, D100 with an $\in_r$ of about 100, or X7R with $\in_r$>1000 or TEFLON®. Examples of relatively high permeability material used for inclusions include, but are not limited to, Z-phase Hexaferrites having $\in_r=\mu_r=12$, G4256 with a $\mu_r$ of about 100, ferrite or other materials with $\mu_r$>1000. In some embodiments, material with a natural relative high permittivity property value of 9 or greater is used and material with a natural relative high permeability property value of 9 or greater is used. A variety of manufacturing techniques may be used to assemble inclusions into interstitial material. For machinable interstitial materials, space for the inclusions may be machined into the interstitial material and the inclusions added as the composite is built up one layer at a time. In some implementations, an injection mold can be used to infuse the interstitial material between inclusion materials. In some implementations, the composite may be assembled starting from the corners or in layers as the interstitial supports and inclusions are combined into the composite.

High permeability inclusions add significant complexity to the composite design because of their relatively high conductivity and because of lossy natural ferromagnetic resonances. By controlling the size of inclusions, the shape of the inclusion, the concentration of inclusions and by varying the composite filler types and morphology it is possible to control frequency dispersion of complex permeability and permittivity of the composite material. It is also possible to reduce the size of high permeability inclusions, while increasing their overall effect on composite permeability by spacing groups of inclusions closely to achieve dielectric enhancement.

Figure 3:
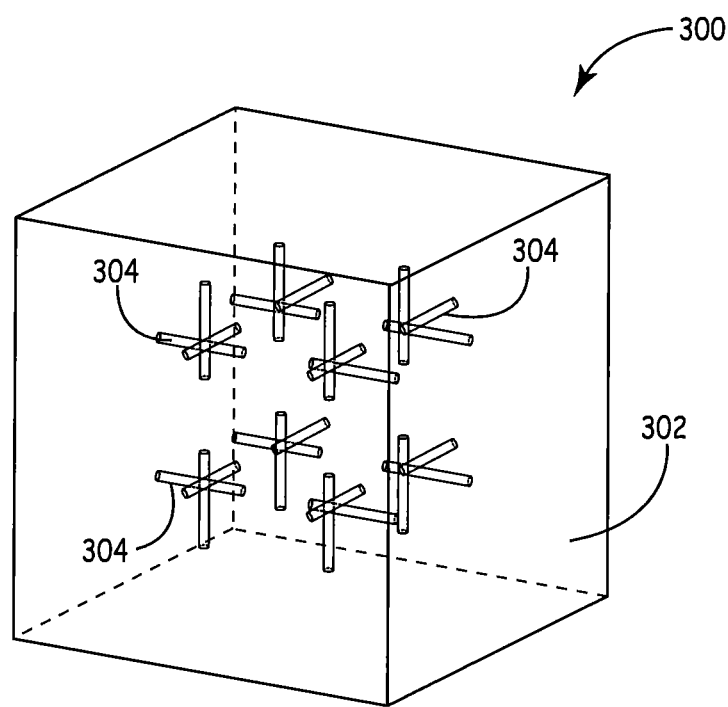
FIG. 3 is a three-dimensional illustration of composite material of yet another embodiment of the present invention.
Figure 4:
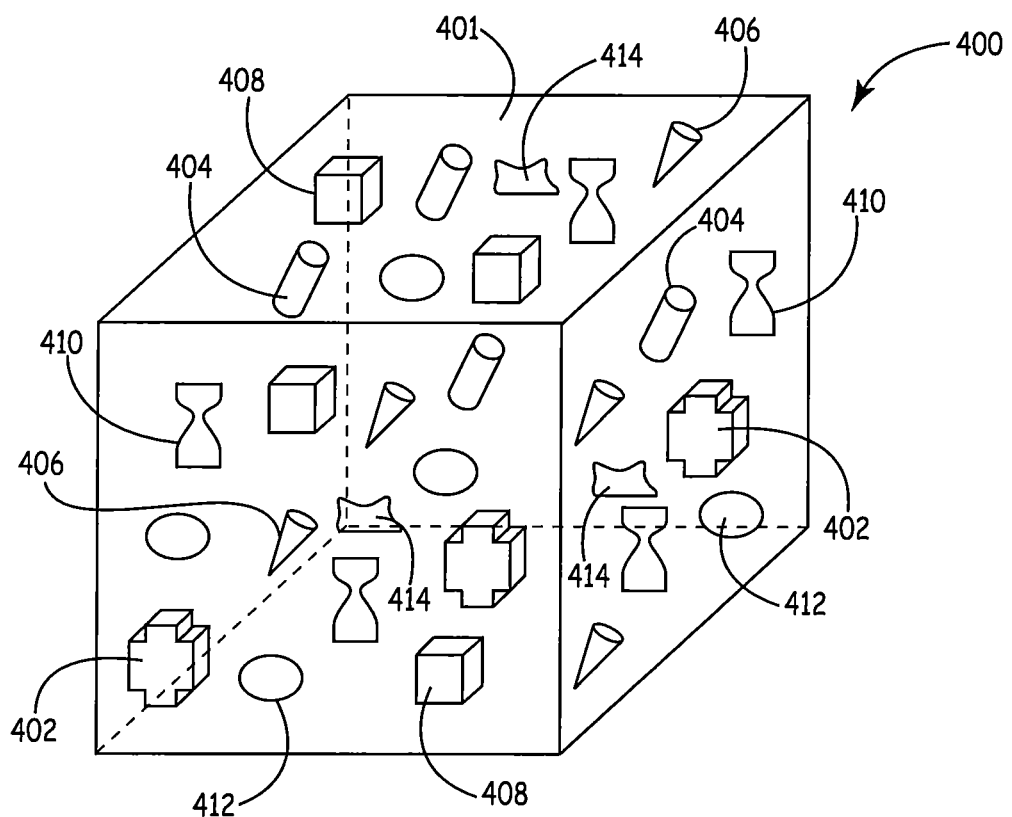
FIG. 4 is a three-dimensional illustration of yet another composite material showing different shapes of inclusions.

As the embodiment of FIG. 1 illustrates, inclusions 104 have defined shapes of cylinders and half-cylinders. In FIG. 2, composite material 200 is illustrated. Composite material 200 includes interstitial material 202 and inclusions 204. In one embodiment, the interstitial material 202 has a select relative permittivity property value and the inclusions 204 have a select relative permeability property value. The shapes of the inclusions 204 are generally cross-shaped. Likewise, in FIG. 3, composite material 300 is illustrated. Composite material 300 includes interstitial material 302 that has a select relative permittivity property value and inclusions 304 that have a select relative permeability property value. The inclusions 304 of FIG. 3 are also generally in a cross-shape that is formed with cylinders. The individual composite inclusions used in embodiments can be any shape including, but not limited to, a cross 402, sphere 412, cylinder 404, cylinder forms 304, cone 406, hourglass 410, cube 408, arbitrary 414, or combinations thereof. For example, FIG. 4 illustrates some possible shapes of inclusions 402, 404, 406, 408, 410, 412 and 414 in interstitial material 401 of composite material 400. It will be understood that different patterns of shapes can be arranged to achieve a structure with desired characteristics. Moreover, the shapes of the inclusions control, in part, by losses by surface effects and element to element effects. Hence, changing the shapes of the inclusions is also used to achieve a structure with desired characteristics in some embodiments.

As illustrated in FIGS. 1, 2 and 3, in some embodiments, the inclusions 104, 204 and 304 are orientated in three-dimensions. For example, referring back to FIG. 3, an X-axis, a Y-axis, and a Z-axis are illustrated and how the inclusions 304 are orientated in relation to the X-, Y- and Z-axes. Having the inclusions orientated along the three-dimensional axes controls anisotropy and dielectric enhancement. Further, in some embodiments, the inclusions 304 are located next to each other in the interstitial material 302 so that they enhance at least one of the permeability or permittivity of the composite material 300 as discussed above. Although the composite material 100, 200, 300 and 400 is illustrated in FIGS. 1, 2, 3 and 4 as having a generally a cube shape, this is only for illustrative purposes. The composite material can have any shape needed for some applications (e.g., in a z-phase hexaferrites embodiment).

In the embodiment discussed above in regard to FIGS. 1 through 4, the interstitial material is described as having a select relative permittivity property value and the inclusions as having a select permeability property value. However, in other embodiments the interstitial material 202 has a select relative permeability property value and the inclusions 204 have a select relative permittivity property value. In further still other embodiments, both the interstitial material 202 and the inclusion 204 have relatively high permeability and relatively high permittivity property values.

As stated above, composite materials have many applications. One application involves the use of composite material in antennas. Examples of antennas include, but are not limited to, microstrip/planar, frequency independent, wire, horn, dish, loop, slot, helical, etc. An antenna is typically one of the largest elements of a radio because it must be on the order of the size of the wavelength for good overall efficiency. By embedding an antenna in a composite of very high permeability and very high permittivity material it is possible to dramatically reduce the size of an antenna while preserving antenna efficiency. This opens new applications for antennas including embodiments of miniature phased and retrodirective arrays for fuzing applications, smaller antennas for medical implants, ground/building/car radars, MRI antennas, cell phones, two-way radios, trunked radio systems, anechoic chambers, missile defense systems, etc., as discussed above. With the use of composite material, the cost and size of the antennas will shrink dramatically. This will result in many new types of products being brought to the market that previously could not be brought to market because of their cost or size.

Figure 5A:
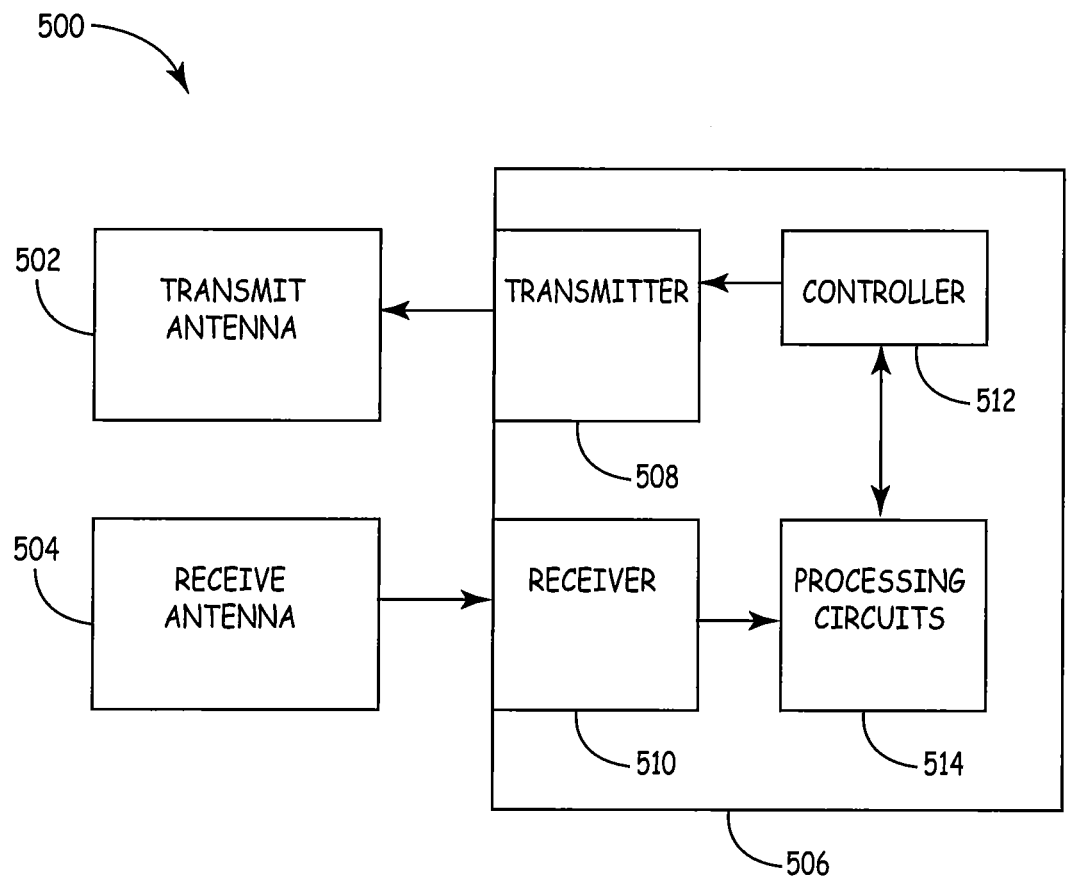
FIG. 5A is a block diagram of a general antenna system of one embodiment of the present invention.

In one antenna embodiment, a composite with individual inclusions smaller than half the wavelength of the incident radio wave is used. Also, the relative permeability and permittivity properties in the composite material of the antenna are selected close in value, which causes the effective intrinsic impedance of the material to closely match that of air. By matching the material to the intrinsic impedance of air, little wave reflection occurs at the material boundary with air, which allows more energy into the antenna thereby increasing efficiency. An example of a device 500 of embodiments implementing antennas as described above is illustrated in the block diagram of FIG. 5A. As illustrated, this device 500 embodiment includes a transmit antenna 502 and a receive antenna 504. At least the receive antenna 504 is made from composite material, as discussed above, having relative permeability and permittivity properties that are selected relatively close in value, which causes the effective intrinsic impedance of the material to closely match that of air. In one embodiment, both the receive and transmit antennas 504 and 502, respectively, are made from composite material as discussed above having relative permeability and permittivity properties that are selected relatively close in value, which causes the effective intrinsic impedance of the material to relatively closely match that of air. The device 500 further includes an operating circuit 506. Operating circuit 506 includes a receiver 510 coupled to receive signals from the receive antenna 504 and transmitter 508 coupled to transmit signals to the transmit antenna 502. Also included in the operating circuit 506, is a controller 512 and processing circuits 514. The controller controls operation of the device 500. The processing circuits 514 process signals received by the receiver 510. The device 500 of FIG. 5A could be any device including, but not limited to, a radar device, a medical implant device, an MRI device as well as communication devices including, but not limited to, cell phones, two-way radios, trunked radios, RFID tags, undersea communication systems, anechoic chambers, missile defense systems, commercial broadcast systems, microscopy systems, smaller broadband PCBs, etc.

Figure 5C:
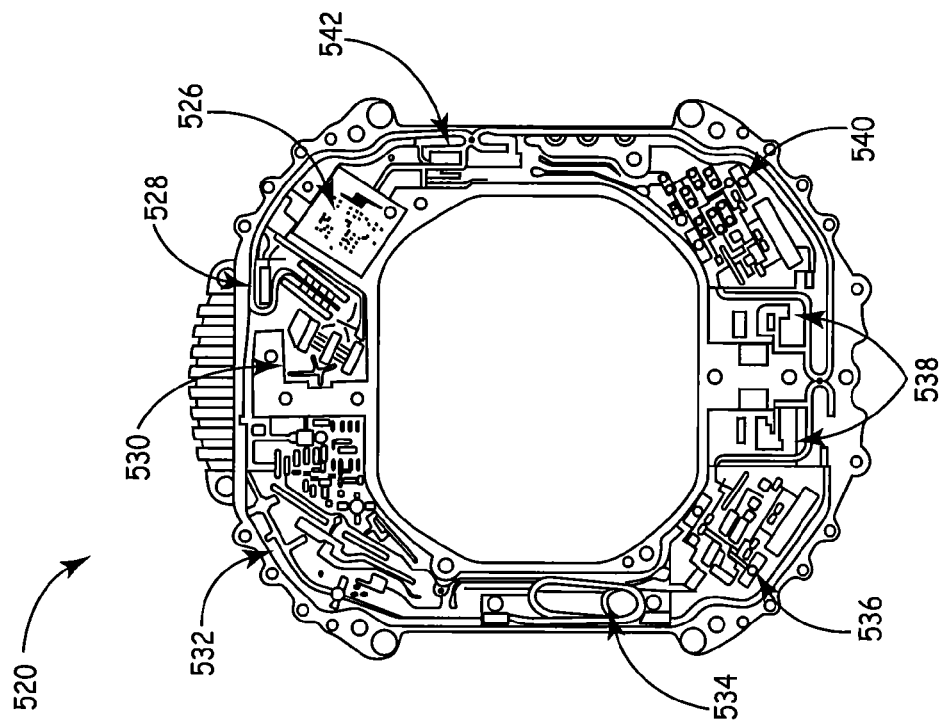
FIG. 5C is a rear view of the radar system of FIG. 5B.
Figure 5B:
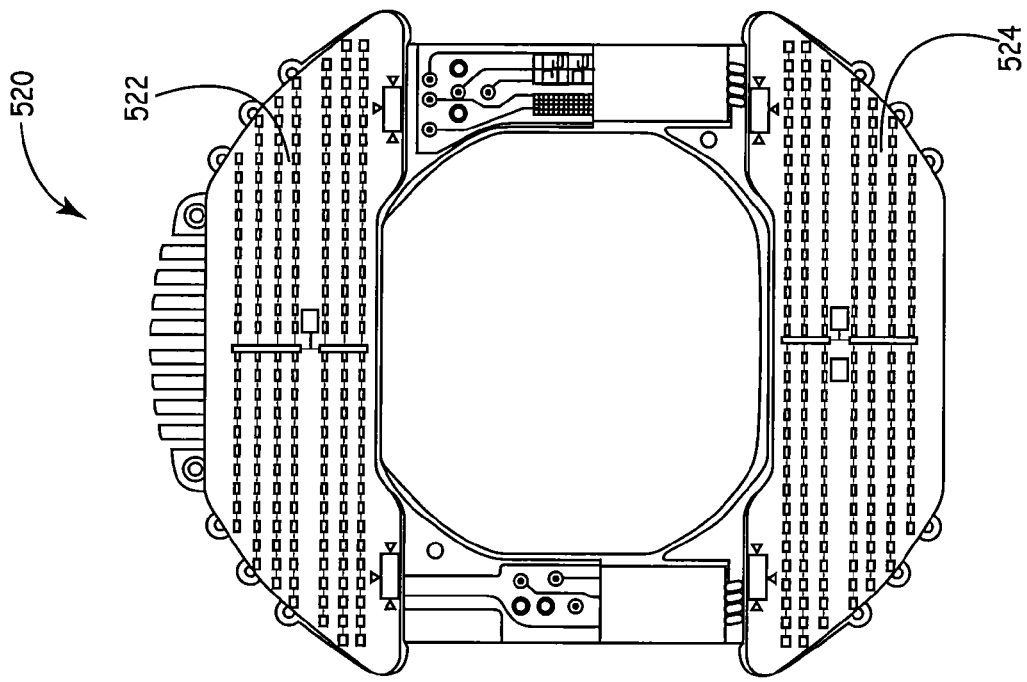
FIG. 5B is a front view of a radar system including antennas with a composite material of one embodiment of the present invention.

Referring to FIG. 5B, an example of a radar module 520 including two antennas 522 and 524 made of composite material of an embodiment is illustrated. In particular, FIGS. 5B and 5C illustrate front and back views, respectively, of an integrated transmit/receive radar module 520 of one embodiment. The radar module 520 includes the transmit antenna 522 and the receive antenna 524. As stated above, the antennas 522 and 524 are made from a composite material that includes interstitial material having a select relative permittivity property value and magnetic material (inclusions) having a select relative permeability property value. The select relative permeability and permittivity properties values are selected so that the effective intrinsic impedance of the interstitial and magnetic material matches the intrinsic impedance of air. The back view of the radar module 520, as shown in FIG. 5C, illustrates that the radar module 520 in this embodiment includes a low phase noise oscillator 526, an up converter 528, a high-power transmitter 530, a VCO/Frequency divider 532, a time delay 534, a second down converter 536, low noise amplifier (LNA) receivers 538, another second down converter 540 and frequency multipliers 542.

Figure 6:
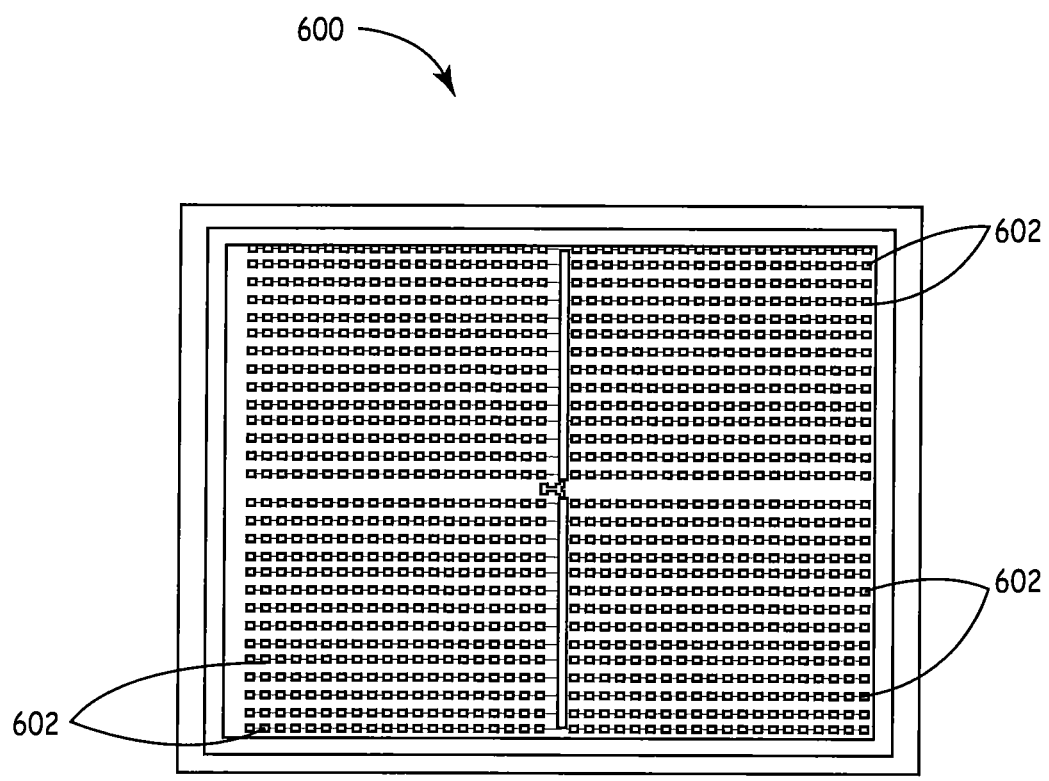
FIG. 6 is a top view of an antenna array of one embodiment of the present invention.

As further discussed above, the composite material can be used in all types of antenna and antenna arrays. For example, referring to FIG. 6, an example of an antenna array 600 is illustrated having a plurality of resonators 602 made from the composite material, as discussed above. Resonators 602 of FIG. 6 are individual patch antennas. In one embodiment, the composite material acts as lens that is positioned over the antenna elements to direct energy to the elements. In further an embodiment, the resonators 602 are near-field resonators that are used in a non-metamaterial way to focus antenna beams while achieving wide bandwidths, wherein the permittivity equals the permeability. In this embodiment, an electro-dielectric is used to focus an antenna.

In another embodiment of an antenna array 600, composite material would surround antenna elements and act as parasitic and/or substrate elements. Antenna parasitic material elements are sometimes used in the design of directional antennas to focus antenna energy. However, traditional parasitic elements are also required to be on the order of the size of the radio wavelength to work effectively. Because of the size restriction of antennas and antenna parasitic elements, it is difficult to develop a directional antenna for miniature proximity sensors. Embodiments of composite material that act as parasitic elements are acted upon by electromagnetic waves similar to antennas and traditional parasitic, but are much smaller because they resonate due to a built-in LC-like resonant structure as opposed to resonating due to the spatial dimensions of the device used by antennas and traditional parasitic. The LC-like parasitic elements can be much smaller than traditional distributed-type parasitic resonators. Because the elements are very small, many of them may be used per wavelength or antenna to finely control and optimize antenna performance parameters such as beamwidth. By designing the parasitic elements using a composite of relatively matched high permeability and high permittivity material it is possible to dramatically reduce antenna size while preserving antenna efficiency because the size of the wave is small in the high-index material, but the material is matched to free-space. The performance of antennas that utilize high-index parasitic and possibly substrates will be on-par with and often better than high-end antennas at a cost on-par with presently available low-cost antennas.

Figure 7A:
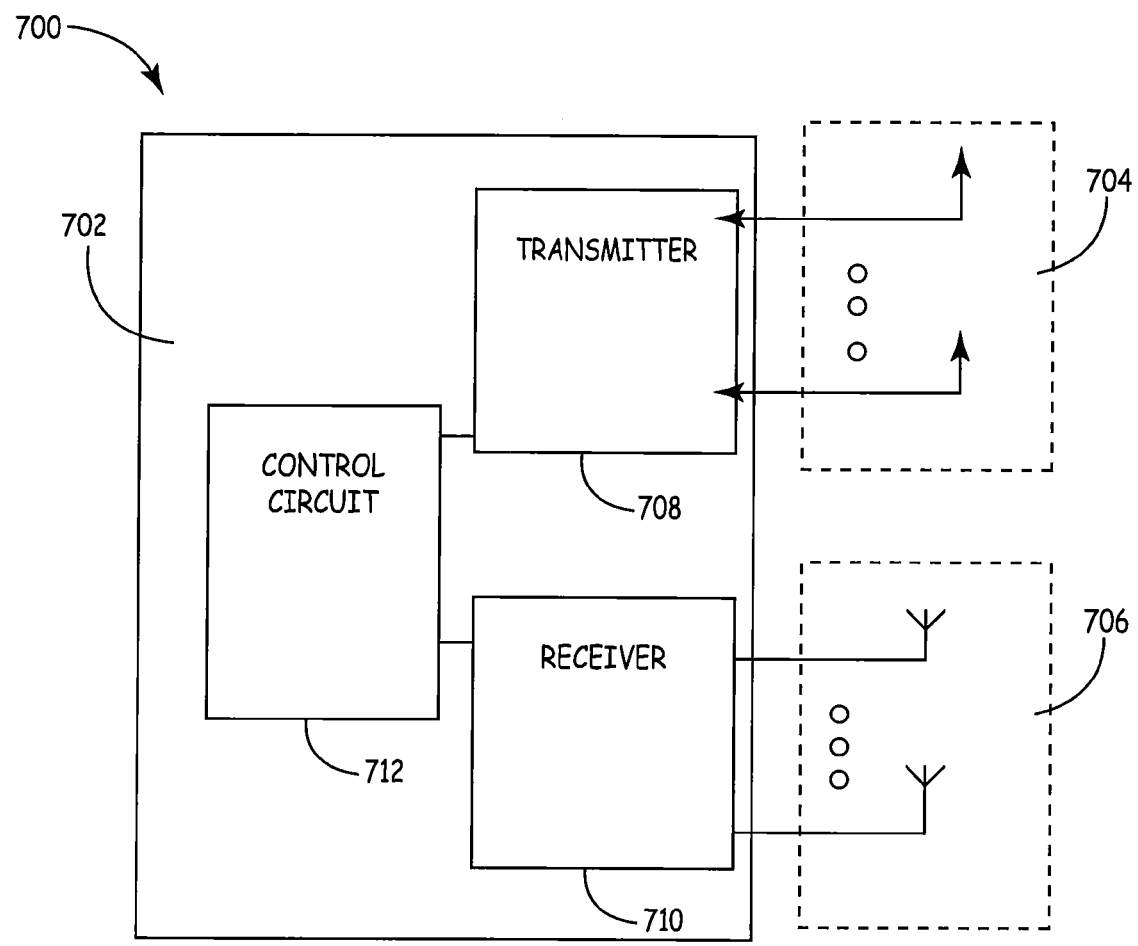
FIG. 7A is a block diagram of a system implementing antenna arrays of one embodiment of the present invention.

Antenna arrays such as antenna array 600 have many applications. An example array system 700 is illustrated in FIG. 7A. In the example array system 700, a transmitting array 704 and a receiving array 706 are respectively coupled to a transmitter 708 and a receiver 710 of an operation circuit 702. A control circuit 712 is in communication with the transmitter 708 and the receiver 710. The transmitting array 704 and the receiving array 706 in this embodiment are made of resonators or non-resonant parasitic elements comprised of composite material having interstitial material having a select relative permittivity property value and material (inclusions) having a select relative permeability property value or a high-index inclusion in an interstitial material of high or low permittivity. The select relative permeability and permittivity property values are selected so that the effective intrinsic impedance of the interstitial material and inclusions match the intrinsic impedance of air. The array system 700 may be any type of system that would benefit from the use of antenna arrays such as, but not limited to, radar-based proximity sensors, such as fuzing/radar systems, building/ground penetration systems, fire-control systems, missile defense systems, and the like. In some embodiments, wideband array techniques known in the art are used to design antenna arrays to compensate for bandwidth reductions that occur as a permittivity or permeability increase.

In a proximity sensor embodiment, the array system 700 can be used to penetrate vegetation, soil, buildings, and metal with high resolution to identify and track targets of interest. In some embodiments, the dielectric properties of the metamaterial or metamaterial-like ($\in$ vs. $\mu$) are relatively matched to improve resolution. The composite provides sub-wavelength resolution that enables proximity sensors to sense with high resolution small objects just below the surface, through vegetation, within buildings, in cave openings, below water and inside metal structures. Super resolution ($\Theta_{min} \ll \lambda/2$ beamwidth) improves clutter rejection and improves dynamic range, which improves depth of penetration and interference rejection (e.g., reduces FM capture effect). The narrow beamwidth reduces the likelihood of interference to other systems. Sub-wavelength techniques have so far achieved up to approximately a 1000-fold improvement in resolution over the diffraction limit with the limit controlled by losses instead of the wavelength. To penetrate vegetation, soil, buildings, metal and water for narrow-band radar utilizing sub-wavelength techniques, an operating frequency of the proximity sensor of approximately 300 MHz or less is used in one embodiment. Below this frequency, soil attenuation is beginning to decrease and it is low enough in attenuation that significant material penetration can occur with reasonable transmit power levels. An additional benefit for proximity sensor ground and building penetration applications is that the reflection by water and soil is much lower versus grazing angle of incidence for frequencies below 1 GHz and decreases significantly with every 100 MHz of frequency reduction. This is important for depth of penetration and to improve the multipath environment. Metamaterials and metamaterial-inspired near-field parasitics can be used to focus antennas to much tighter beamwidths than achievable using conventional diffraction limited techniques. This can be used to implement narrow beamwidths on low-cost proximity sensors at low radio frequencies, as stated above, as well as for ignoring clutter in ammunition fired at low inclination angles, to detect personnel targets and many other ways to improve proximity sensor performance. In one embodiment, sub-wavelength illumination and sub-wavelength imaging are incorporated into the ground penetrating radar 700 to make it possible to discern details within objects such as automobiles and armored vehicles to optimize an attack point.

Figure 7B:
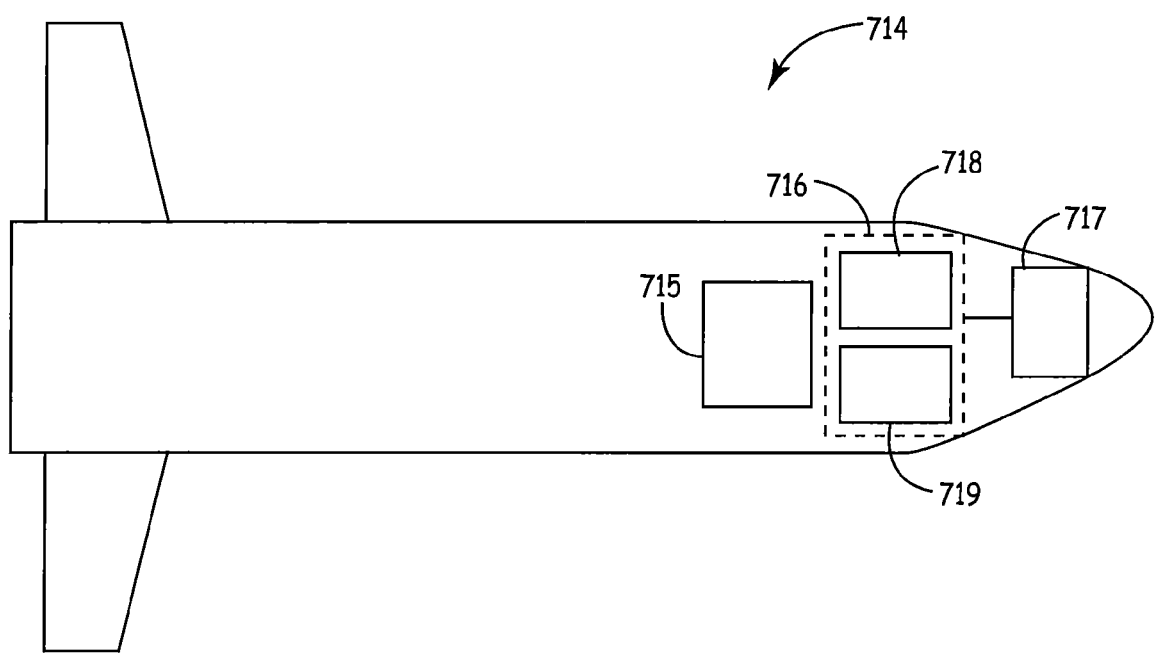
FIG. 7B is a block diagram of a weapon system implementing antenna arrays of one embodiment of the present invention.

In one embodiment, simple height of burst (HOB) sensors include low-cost target sensing systems and imaging seeker system implemented antenna systems with composite material, as discussed above, to enhance the capabilities of weapon systems. An example of a weapon system 714 is illustrated in FIG. 7B. In FIG. 7B, the weapon system 714 is illustrated as having a controller 715, an HOB sensor 716 and an antenna 717. HOB sensor 716 may include a target sensor 718 and an image seeker 719. As stated above, the antenna 717 is made from composite material as discussed above. Although FIG. 7B illustrates the use of one antenna 717, more than one antenna could be used. The use of the composite material in the antenna 717 further provides protection against RF jammers. Typically, a circuit based on a semiconductor junction is used on RF front-ends to protect from unintentional and intentional high-power RF jammers. Because magnetic materials are used in the antenna composite, high-level interference will cause the magnetic material to saturate. Magnetic saturation of the front-end will attenuate the undesired and desired signal, but will handle much higher interference power as compared to semiconductor protection because the jammer power is dissipated across the 3D antenna structure instead of across a 2D semiconductor junction. Because the antenna performance itself degrades under jam, very little of the products of the nonlinear mixing action that occurs due to saturation effects are re-radiated as compared to the diode approach. This prevents the jammer from detecting spurious signals created at the proximity sensor by the jammer. The primary effect of magnetic saturation is to attenuate the incoming signals. For proximity sensors operating with a wide linear dynamic range and strong signal-to-noise ratio under nominal conditions it is possible for the proximity sensor to detect the desired signal while being jammed with high-power interference. The new composite will enable a dramatic improvement in frontend protection and jam resistance over current generation proximity sensors.

Figure 7C:
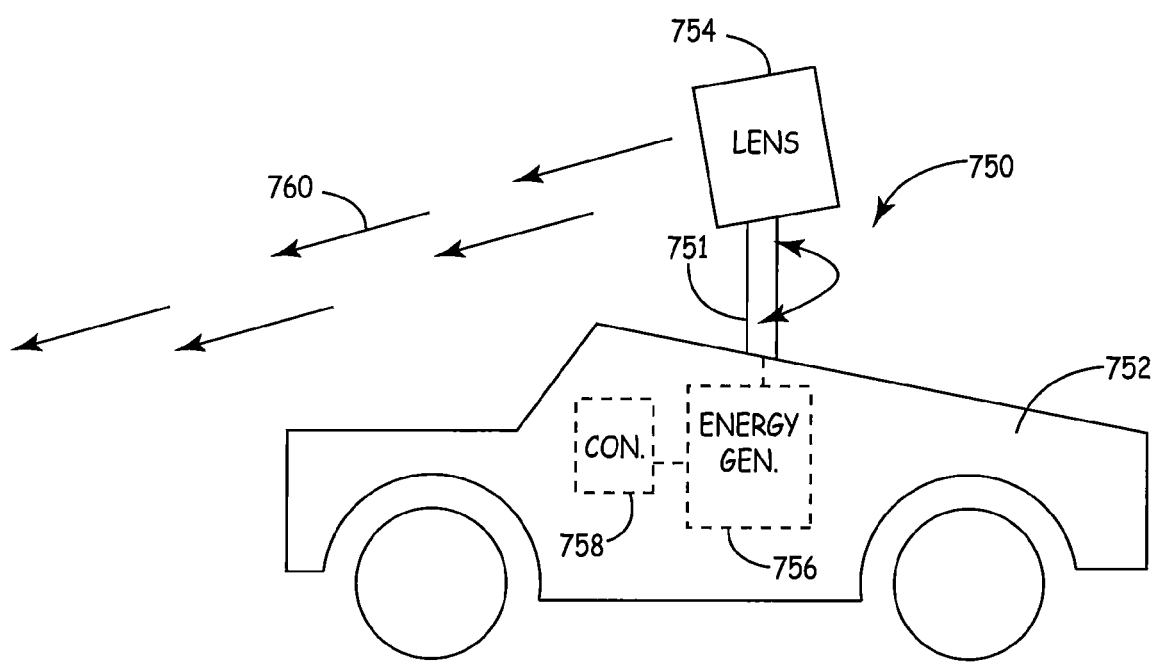
FIG. 7C is a block diagram of a directed energy weapon system of one embodiment of the present invention.

Another type of weapon system that implements composite material is a directed energy weapon system 750 illustrated in FIG. 7C. In this embodiment, a lens 754 composed of composite material is used to direct energy 760 to a desired location. This energy weapon system 750 included a support 751 that positions the lens 750 to direct the energy 760 to a desired location. The support 751, in this embodiment, is coupled to a vehicle 752. A controller 758 controls an energy generator 756 to selectively generate the energy 760 directed by the lens 750. As stated above, the lens 750 is made from composite material. In particular, the composite material in an embodiment includes interstitial material and inclusion material having select relative permeability and permittivity property values such that the effective intrinsic impedance of the composite material matches the intrinsic impedance of air. The embodiment of the energy weapon system 750 mounted to a vehicle can be used for defeating/destroying IEDs, and the like. In another application, the energy weapon system 750 is used as a missile defense system to defeat/destroy incoming missiles, and the like. The missile defense energy weapon system 750 may be stationary or mobile. A mobile missile defense energy weapon system 750 is mounted on a vehicle such as, but not limited to, a truck, plane, ship or train. In one embodiment, the energy 760 generated by the energy generator 756 is electromagnetic.

Figure 8A:
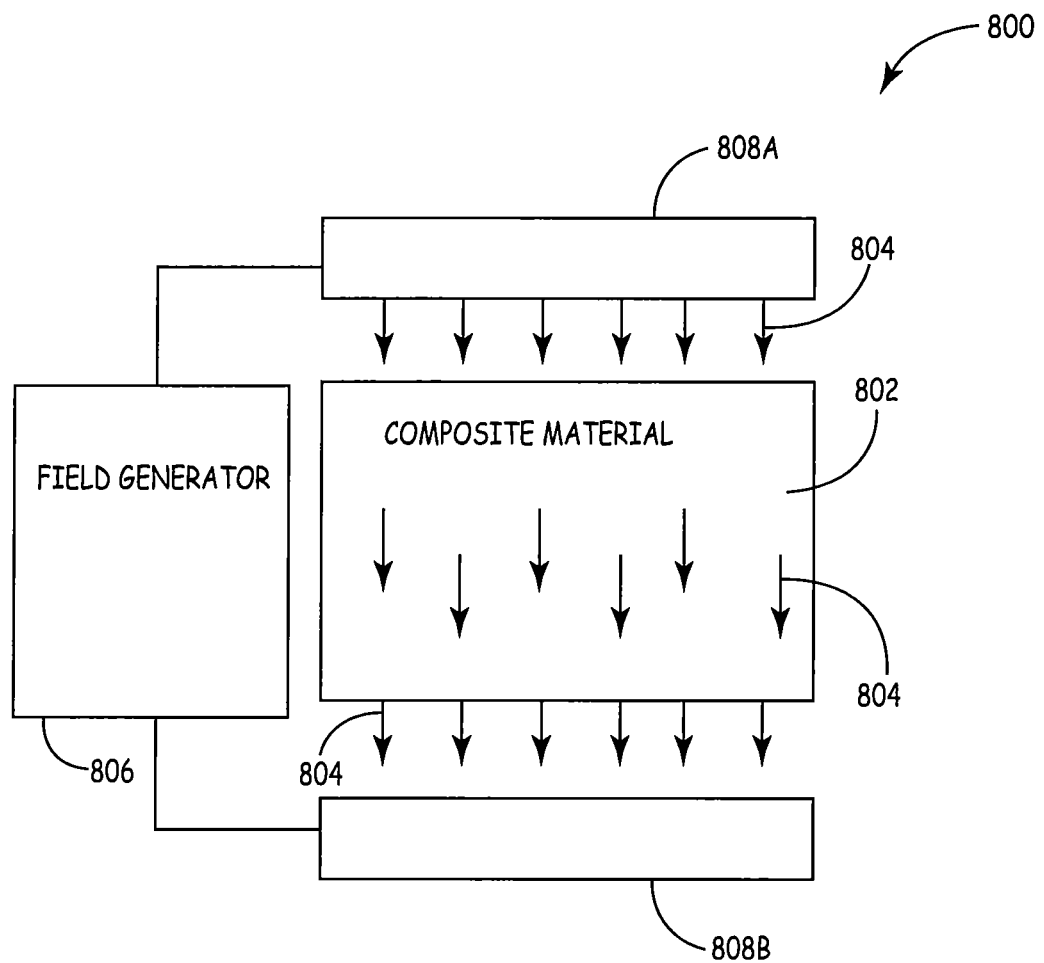
FIG. 8A is a block diagram of a system to tune composite material of one embodiment of the present invention.

In some applications using lenses, it will be necessary to adjust the properties of lens elements dynamically without saturation as the near-field changes with time. All antennas generate near-fields that are very complicated and change dramatically with time. For some near-field lens applications, it may not be possible to achieve the desired focal point or other features with lens elements exhibiting constant effective dielectric properties. This is particularly true as the environment of a lens changes and as the near-field penetrates various materials within the environment. Changing the effective material properties to compensate for changes in the near-field of the source antenna is similar to using antenna array techniques in that different elements of the array are stimulated differently, but in the case of antenna arrays the inventors are stimulating the source elements differently, not the individual lens elements. Antenna array theory also is mostly concerned with the far-field, whereas near-field lens tuning is concerned with adapting the lens elements to compensate for local changes in the near-field. In some embodiments, each lens element in a lens, such as lens 754 is subject to a magnetic and/or electric field of a given strength to dynamically adjust the property of the lens element. An example of the application of a field is illustrated generally in FIG. 8A. In FIG. 8A (further discussed below) a field generator 806 applies a field 804 across composite material 802 which in this embodiment is a lens element 802.

Figure 7D:
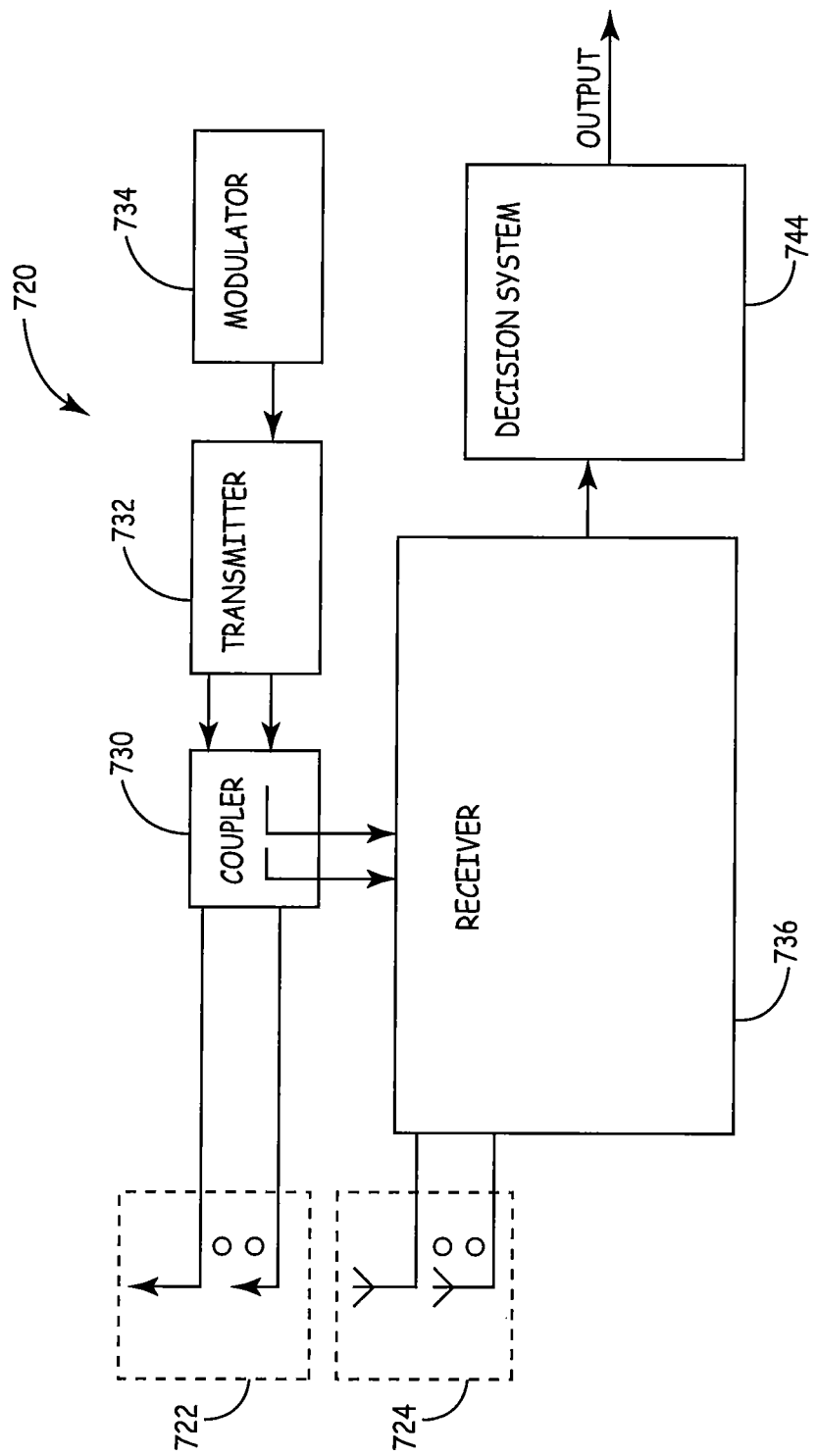
FIG. 7D is a block diagram of a radar fuzing system of one embodiment of the present invention.

An example of a radar fuzing system 720 implementing an array system of an embodiment is illustrated in the block diagram of FIG. 7D. Radar fuzing systems are generally used to determine valid signal returns from invalid signal returns. The use of antenna arrays 722 and 724 of this embodiment provides benefits over other types of antenna systems including, but not limited to, the benefit of enabling miniature low-cost arrays for monostatic, hi-static, forward scatter/shadow, frequency stepped, Ultra-Wideband, multiple-input and multiple-output (MIMO) radar fuzing capabilities. The transmit antenna array 722 and the receive antenna array 724 in this embodiment are made of resonators comprised of composite material having interstitial material having a select relative permittivity property value and magnetic material (inclusions) having a select relative permeability property value or vice versa. The select relative permeability and permittivity properties values are selected so that the effective intrinsic impedance of the interstitial and magnetic material approximately matches the intrinsic impedance of air. In this embodiment, a modulator 734 applies a select modulation to transmitter 732. In response to the modulation, the transmitter 732 transmits one or more transmit signals to a coupler 730. The coupler 730 passes the transmit signals to the transmit antenna array 722 and receiver 736. Signals received by receiver 736 via the receive antenna array 724 are processed and compared against the signals from the coupler 730. The receiver 736 then outputs the comparison to the decision circuit 744 for analysis. The decision circuit 744 then determines whether or not the return signal is a valid signal. Once a determination of a valid or non-valid signal is determined, an appropriate output is then provided by the decision circuit 744. Embodiments of the radar fuzes have enhanced phase and retrodirective capability due to miniaturized phased array radar antennas and phased array antennas that can be used on a small projectile.

Figure 8B:
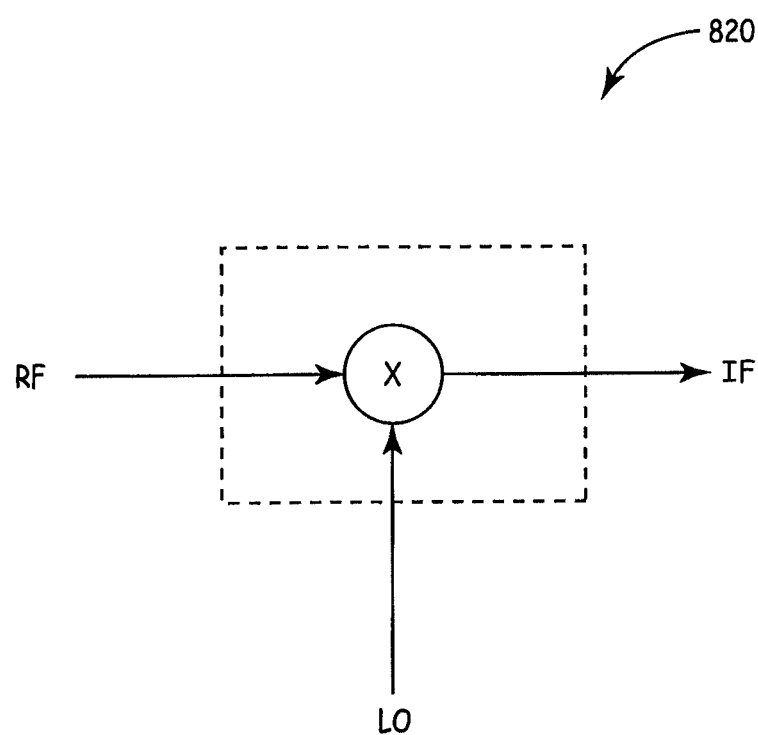
FIG. 8B is a block diagram of a mixer of one embodiment of the present invention.
Figure 8C:
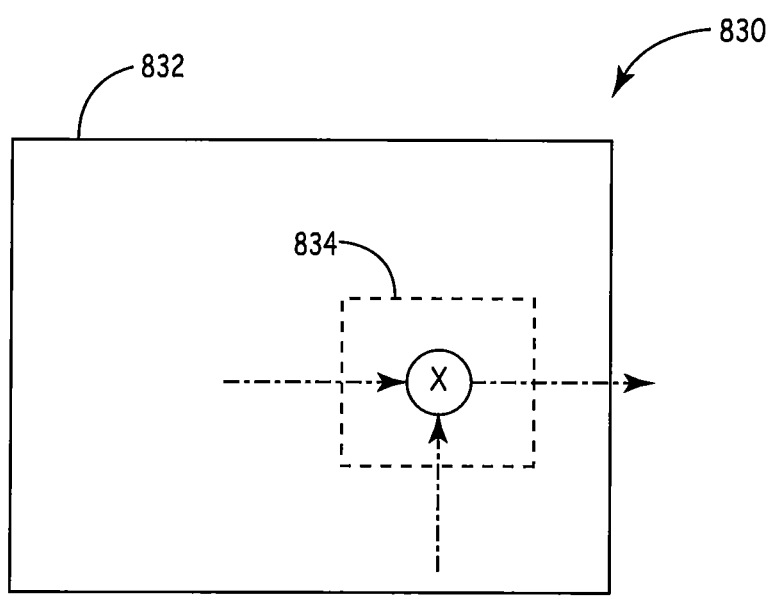
FIG. 8C is a block diagram of a mixer formed in an antenna of one embodiment of the present invention.

In further embodiments, voltage, current or externally applied electric or magnetic fields, are used on the composite material to tune the composite material for a desired application. In some embodiments, the external electrical or magnetic fields applied to the composite materials are varied or turned on and off. FIG. 8A illustrates an example of a device 800 with such a system. In FIG. 8A composite material 802, such as the composite material discussed above, is subject to a field such as a magnetic field 804 generated between plates 808A and 808B by field generator 806. An example embodiment that implements composite material that can be tuned is a mixer. By turning a magnetic field on and off, the composite material can be used as a mixer. Mixing occurs by alternately magnetically saturating or detuning (i.e., turning off) and removing the saturation/tuning in (i.e., turning on). Using magnetic saturation limits the range of frequencies at which the technique can be applied; however, a non-magnetic metamaterial tuning mixer allows a broad range of frequencies to optical and higher. Metamaterials are effectively non-linear circuits that use resonance to control effective material properties. By changing local oscillator frequency or amplitude, a mixer can be designed to implement the mixer by changing the nonlinear characteristics of a metamaterial so it behaves like a diode-based mixer. An example mixer 820 is illustrated in FIG. 8B. In this example, a radio frequency (RF) is combined with a local oscillator (LO) frequency to produce an intermediate frequency (IF). Hence, you can achieve a desired output (such as the IF of FIG. 8B) by adjusting one of the frequencies of the inputs (RF or LO). In one embodiment, a magnetic field strength applied to the mixer 820 is selectively varied to change the physical permeability. This changes the resonant frequency, which in turn changes the effective permeability and effective permittivity of the mixer 820. In another embodiment, using the composite material 832 for an antenna 830, a mixer 834 is formed in the antenna 830 itself with the benefits as discussed above. This embodiment is illustrated in FIG. 8C. Combining the mixer 834 with the antenna 830 provides an opportunity for improved noise performance.

Figure 8D:
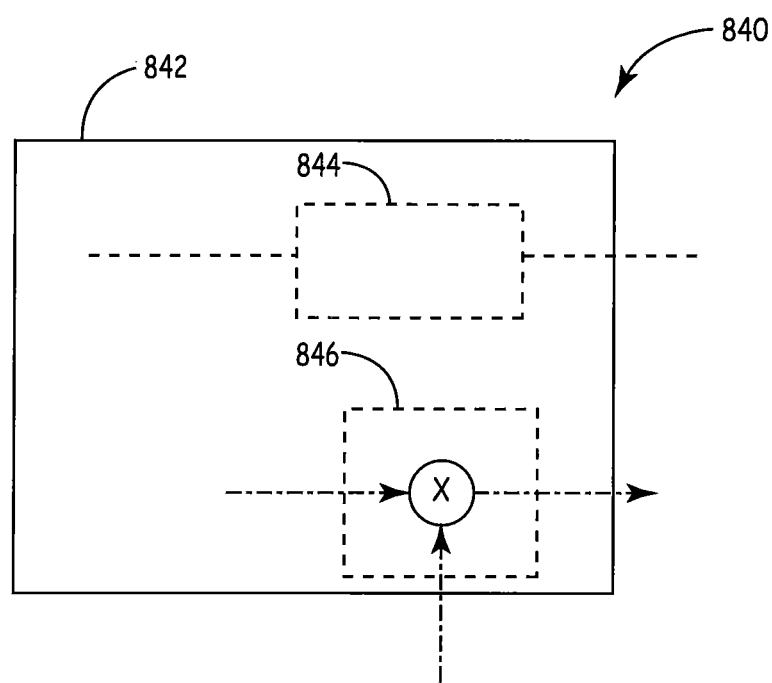
FIG. 8D is a block diagram of an antenna having both a mixer and a filter formed therein of one embodiment of the present invention.

In a similar manner, front-end adaptive filters embodiments are designed to be tuned using the composite metamaterial. By tapering the material properties and/or including loss into the composite, either intentionally or inherently, the composite can be used for electromagnetic interference (EMI) protection or stealth material and to match to another material. Protecting from EMI using a composite region is more effective than a protection diode because a much larger protection region compared to a diode junction is provided using a composite, which allows protection to higher power levels. In one embodiment, at least one filter 844 is formed in the antenna 840. In another embodiment, illustrated in FIG. 8D, at least one filter 844 and at least one mixer 846 are formed in an antenna of the composite material 842. By implementing filters and mixing into the antenna substrate, noise performance is improved by moving filtering and down-conversion as close as possible to the antenna. High-index composites may act as dielectric antennas whether an antenna is embedded in the material or not. The thickness of the material is such that it is on the order of at least one wavelength (in the composite) in order to shrink the size of antennas dramatically, while maintaining efficiency and minimizing reflections at the antenna surface.

Figure 9:
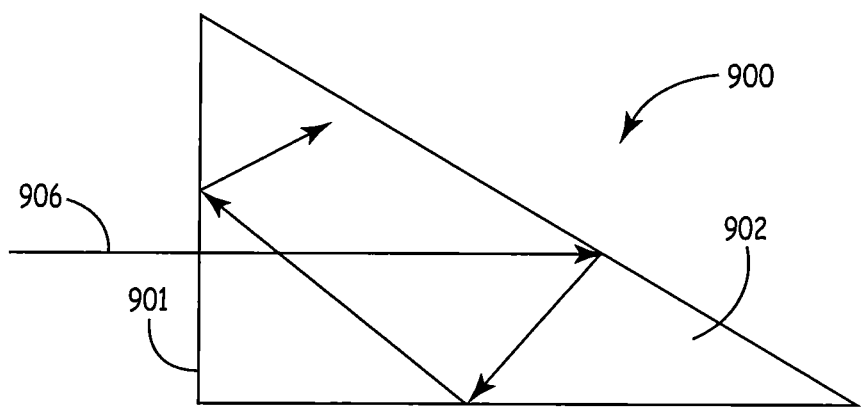
FIG. 9 is a side cross-sectional view of stealth absorber material of one embodiment of the present invention.

Another example of an embodiment is illustrated in FIG. 9. In FIG. 9, stealth absorber material 900 (RF absorber) is formed from the composite material. In this example, composite material 902 is located at an air/material boundary 901. The composite material 902 includes interstitial material in one example embodiment having a select relative permittivity property value and a plurality of permeability inclusions received in the interstitial material or vice versa. That is, in another example embodiment, the interstitial material may have a select relative permeability value and the inclusions may have a select relative permittivity value. Regarding the first example embodiment, the select relative permittivity property value of the interstitial material and select permeability property values of the permeability inclusions are selected so that the effective intrinsic impedance of the interstitial material and the permeability inclusions match the intrinsic impedance of air. Hence, a radar signal 906 is not reflected at the air/material boundary 901 but is absorbed into the composite material 902, as illustrated. In one embodiment, anisotropic composite material is used. With the anisotropic material, the absorption or reflection behaves differently depending upon which axis the radio wave is incident. For example, in FIG. 9, the radio wave 906 is first incident on the air/material boundary 901 at generally a perpendicular angle. Because of this angle, the radio wave 906 is received in the composite material 902. As further illustrated, the radio wave 906 is retained in the material 902 when the angle of incident is not generally perpendicular to a material boundary. In another embodiment, the metamaterials or resonant near-field composites are selected that have a permeability that approaches infinity and a permeability that also approaches infinity. In this embodiment, the wave speed is slowed so it effectively stops the incident wave. Examples of items that could implement the stealth absorbing material as a coating include, but are not limited to, missiles, aircraft, boats, anechoic chambers, etc. The stealth material 900 is also used in embodiments as an EMI protection for electronic circuits and the like.

Figure 10:
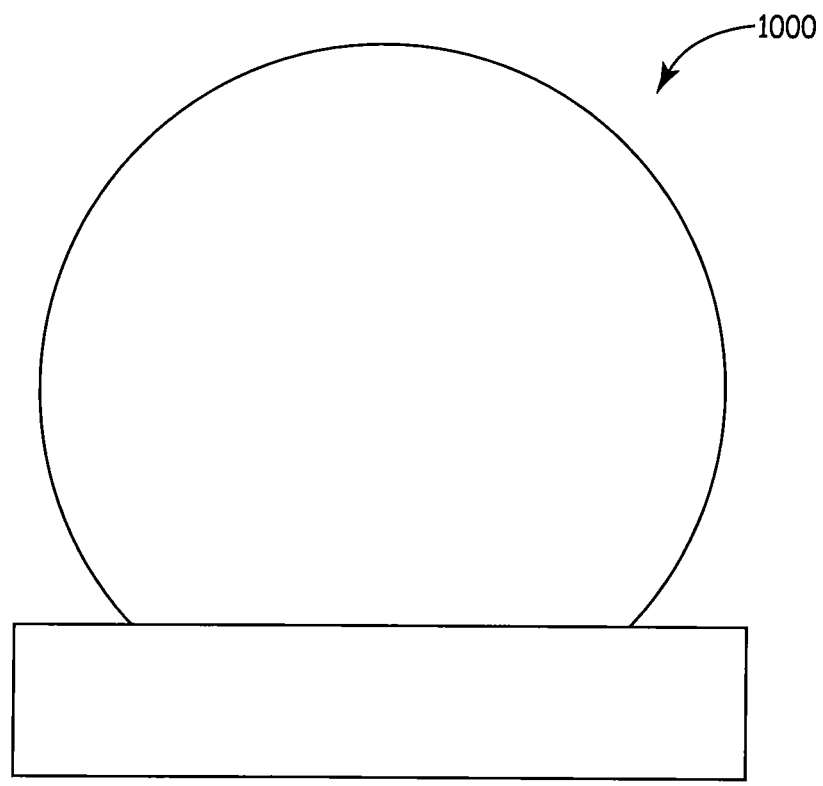
FIG. 10 is a side view of a radome of one embodiment of the present invention.

FIG. 10 further provides another embodiment. FIG. 10 illustrates a side view of a radome 1000 of an embodiment. Radomes have a multitude of different shapes so embodiments are not limited by shape. The function of a radome 1000 is to protect a lens or radar from outside weather environments. In some embodiments, the composite material is used as a radome. In these embodiments, the composite material functions as a traditional radome to protect a lens, radar or other equipment from environmental conditions as well as functions as described in the above various embodiments (i.e., including, but not limited to, near-field parasitic, lenses, stealth material, antennas, mixers, filters, etc.).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. An antenna system comprising:
    at least one antenna comprising a composite material, the composite material of the at least one antenna comprising:
        interstitial material having at least one of a select relative permittivity value or a select relative permeability value; and
        inclusion material received within the interstitial material, the inclusion material having at least the other one of a select relative permeability value or a select relative permittivity value, the select relative permeability and permittivity values of the interstitial material and the inclusion material providing an effective intrinsic impedance of the composite material that closely matches an intrinsic impedance of air.

2. The antenna system of claim 1, wherein the at least one antenna is at least one receive antenna, and wherein the antenna system further comprises:
    a receiver coupled to receive signals from the at least one receive antenna;
    a processing circuit to process signals from the receiver; and
    a controller to control operations of the processing circuit.

3. The antenna system of claim 2, further comprising:
    at least one transmit antenna; and
    a transmitter coupled to the at least one transmit antenna to transmit signals out of the at least one transmit antenna, the controller coupled to the transmitter to control the operations of the transmitter.

4. The antenna system of claim 1, wherein the at least one antenna comprises at least one receive antenna, and wherein the antenna system further comprises at least one transmit antenna, wherein the at least one receive antenna and the at least one transmit antenna are part of a radar module.

5. The antenna system of claim 1, wherein the at least one antenna is at least one antenna array.

6. The antenna system of claim 5, wherein the at least one antenna array further comprises:
    a transmitting array, and
    a receiving array; and
wherein the antenna system further comprises:
    a transmitter in communication with the transmitting array;
    a receiver in communication with the receiving array; and
    a control circuit in communication with the transmitter and the receiver.

7. The antenna system of claim 6, further comprising:
    a modulator configured to apply a select amount of modulation to the transmitter; and
    a coupler configured to pass transmit signals to the transmitting array and the receiver, wherein the control circuit is a decision circuit configured to determine whether a signal is a valid return signal.

8. The antenna system of claim 1, further comprising:
    a height of burst sensor in communication with the at least one antenna; and
    a controller in communication with the height of burst sensor.

9. The antenna system of claim 8, wherein the height of burst sensor further comprises:
    a target sensor; and
    an image sensor.

10. The antenna system of claim 1, further comprising:
at least one filter formed in the at least one antenna.

11. The antenna system of claim 1, further comprising:
at least one mixer formed in the at least one antenna.

12. The antenna system of claim 1, wherein the select relative permeability value and the select relative permittivity value of at least one of the interstitial material or the inclusion material are close in value.

13. The antenna system of claim 1, wherein the inclusion material is orientated along three-dimensional axes to control anisotropy and dielectric enhancement.

14. The antenna system of claim 1, wherein positioning of the inclusion material within the interstitial material enhances at least one of the permeability or the permittivity of the composite material.

15. The antenna system of claim 1, wherein the inclusion material includes a plurality of inclusions with at least one inclusion having a shape selected from the group of shapes consisting of cross, sphere, cone, cylinder, cylinder forms, hourglass, cube, and a curved surface.

16. The antenna system of claim 1, wherein the select relative permittivity value and the select relative permeability value of at least one of the interstitial material or the inclusion material is configured to change by the application of at least one of a magnetic or an electric field on the composite material.

17. An antenna system comprising:
at least one receive antenna, the at least one receive antenna including a composite material comprising:
interstitial material having a permittivity value and a permeability value; and
inclusion material received within the interstitial material, the inclusion material having a permeability value and a permittivity value, the permeability value and the permittivity value of the interstitial material and the permeability value and the permittivity value of the inclusion material providing an effective intrinsic impedance of the composite material of the at least one receive antenna that closely matches an intrinsic impedance of air; and
at least one transmit antenna, the at least one transmit antenna including a composite material comprising:
interstitial material having a permittivity value and a permeability value; and
inclusion material received within the interstitial material, the inclusion material having a permeability value and a permittivity value, the permeability value and the permittivity value of the interstitial material and the permeability value and the permittivity value of the inclusion material providing an effective intrinsic impedance of the composite material of the at least one transmit antenna that closely matches the intrinsic impedance of air.

18. The antenna system of claim 17, further comprising:
a receiver coupled to receive signals from the at least one receive antenna; and
a transmitter coupled to transmit signals out of the at least one transmit antenna.

19. The antenna system of claim 18, further comprising:
a controller to control operations of the transmitter.

20. The antenna system of claim 17, wherein the at least one receive antenna is a receiving antenna array and the at least one transmit antenna is a transmitting antenna array.

21. An antenna system comprising at least one antenna comprising a composite material, the composite material of the at least one antenna comprising:
interstitial material; and
inclusion material in the interstitial material, a permeability value and a permittivity value of the interstitial material and a permeability value and a permittivity value of the inclusion material providing an effective intrinsic impedance of the composite material that closely matches an intrinsic impedance of air.

* * * * *